(12) United States Patent
Soulhi et al.

(10) Patent No.: US 10,931,700 B2
(45) Date of Patent: *Feb. 23, 2021

(54) METHOD AND SYSTEM FOR ANOMALY DETECTION AND NETWORK DEPLOYMENT BASED ON QUANTITATIVE ASSESSMENT

(71) Applicant: Verizon Patent and Licensing Inc., Washington, DC (US)

(72) Inventors: Said Soulhi, Boston, MA (US); Bryan Christopher Larish, Westfield, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/797,192

(22) Filed: Feb. 21, 2020

(65) Prior Publication Data
US 2020/0267174 A1 Aug. 20, 2020

Related U.S. Application Data

(63) Continuation of application No. 16/279,537, filed on Feb. 19, 2019, now Pat. No. 10,616,257.

(51) Int. Cl.
| | | |
|---|---|---|
| *H04L 29/06* | (2006.01) |
| *H04L 12/26* | (2006.01) |
| *H04L 12/24* | (2006.01) |
| *H04W 12/12* | (2021.01) |
| *H04W 24/02* | (2009.01) |
| *H04W 24/10* | (2009.01) |

(52) U.S. Cl.
CPC .......... *H04L 63/1425* (2013.01); *H04L 41/16* (2013.01); *H04L 41/5009* (2013.01); *H04L 43/16* (2013.01); *H04W 12/12* (2013.01); *H04W 24/02* (2013.01); *H04W 24/10* (2013.01)

(58) Field of Classification Search
CPC . H04L 41/16; H04L 41/5009; H04L 41/5019; H04L 43/16; H04L 43/50; H04L 63/1425; H04L 12/46; H04L 49/15; H04W 12/12; H04W 24/10; H04W 24/08; H04W 16/18; G06F 11/3476; G06N 3/0454; G06N 3/0472

See application file for complete search history.

(56) References Cited

U.S. PATENT DOCUMENTS

| | | | | |
|---|---|---|---|---|
| 2009/0052333 A1* | 2/2009 | Vankov | .................... | H04L 43/50 370/242 |
| 2009/0059814 A1* | 3/2009 | Nixon | .................... | H04W 16/18 370/254 |

(Continued)

*Primary Examiner* — Le H Luu

(57) ABSTRACT

A method, a device, and a non-transitory storage medium provide a validation and anomaly detection service. The service includes quantitatively assessing latent space data representative of network performance data, which may be generated by a generative model, based on quantitative values pertaining to quantitative criteria. The quantitative criteria may include Hausdorff distances, divergence, joint entropy, and/or total correlation. The service further includes generating geogrid data for services areas of deployed network devices and service areas for prospective and new deployments based on selected latent space data and corresponding network performance data.

20 Claims, 15 Drawing Sheets

(56) References Cited

U.S. PATENT DOCUMENTS

| | | | | |
|---|---|---|---|---|
| 2015/0256410 A1* | 9/2015 | Beshai | ................... | H04L 49/15 |
| | | | | 370/254 |
| 2016/0269279 A1* | 9/2016 | Beshai | ................... | H04L 12/46 |
| 2018/0123911 A1* | 5/2018 | Zhang | ................ | H04L 41/5019 |
| 2018/0359651 A1* | 12/2018 | Mota | .................... | H04W 24/08 |
| 2019/0081874 A1* | 3/2019 | Saha | .................. | H04L 43/0817 |
| 2019/0149425 A1* | 5/2019 | Larish | ................. | G06N 3/0454 |
| | | | | 706/16 |
| 2019/0287217 A1* | 9/2019 | Cooke | ................. | G06N 3/0454 |
| 2019/0347548 A1* | 11/2019 | Amizadeh | ............ | G06N 3/0472 |

* cited by examiner

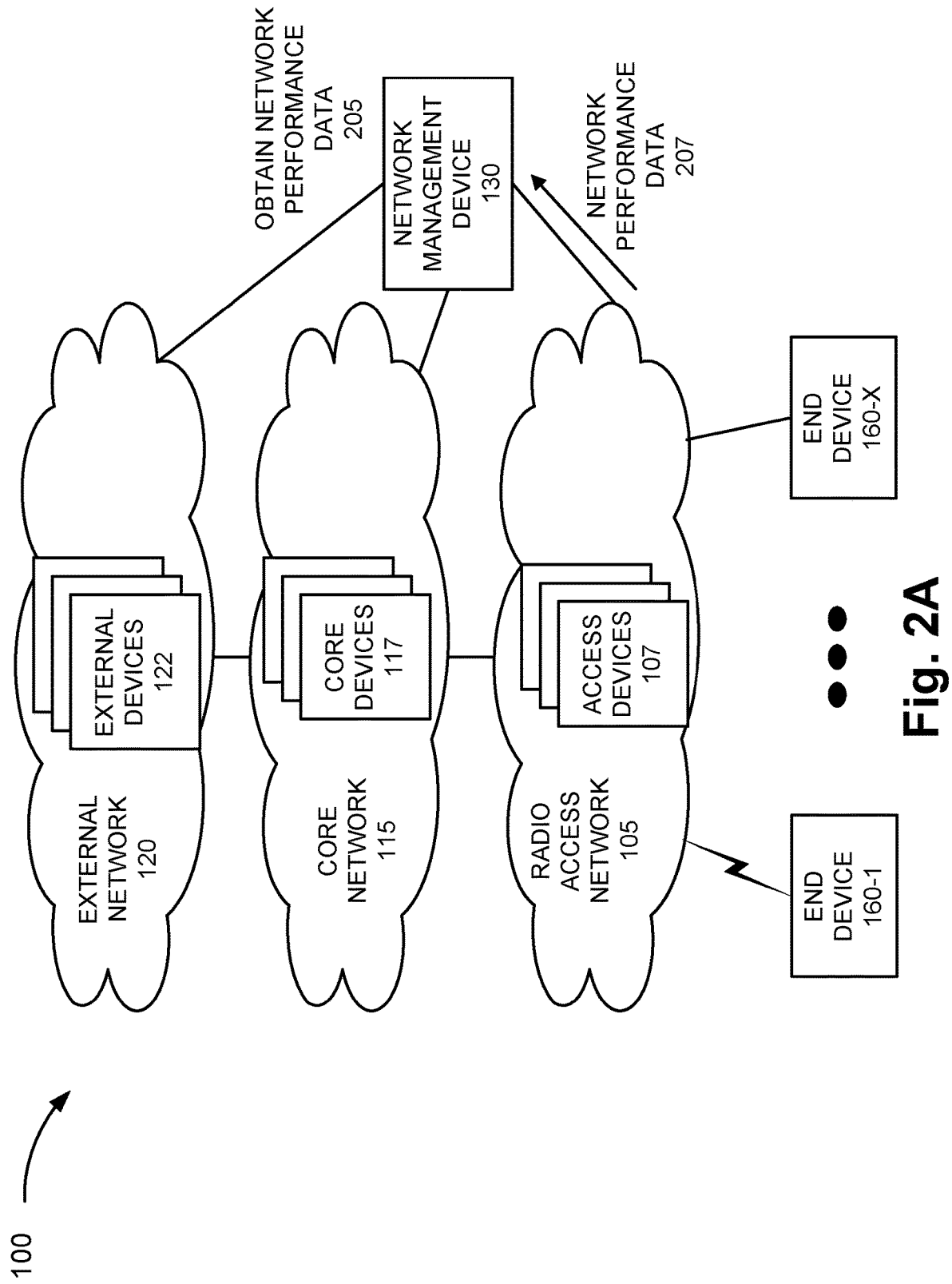

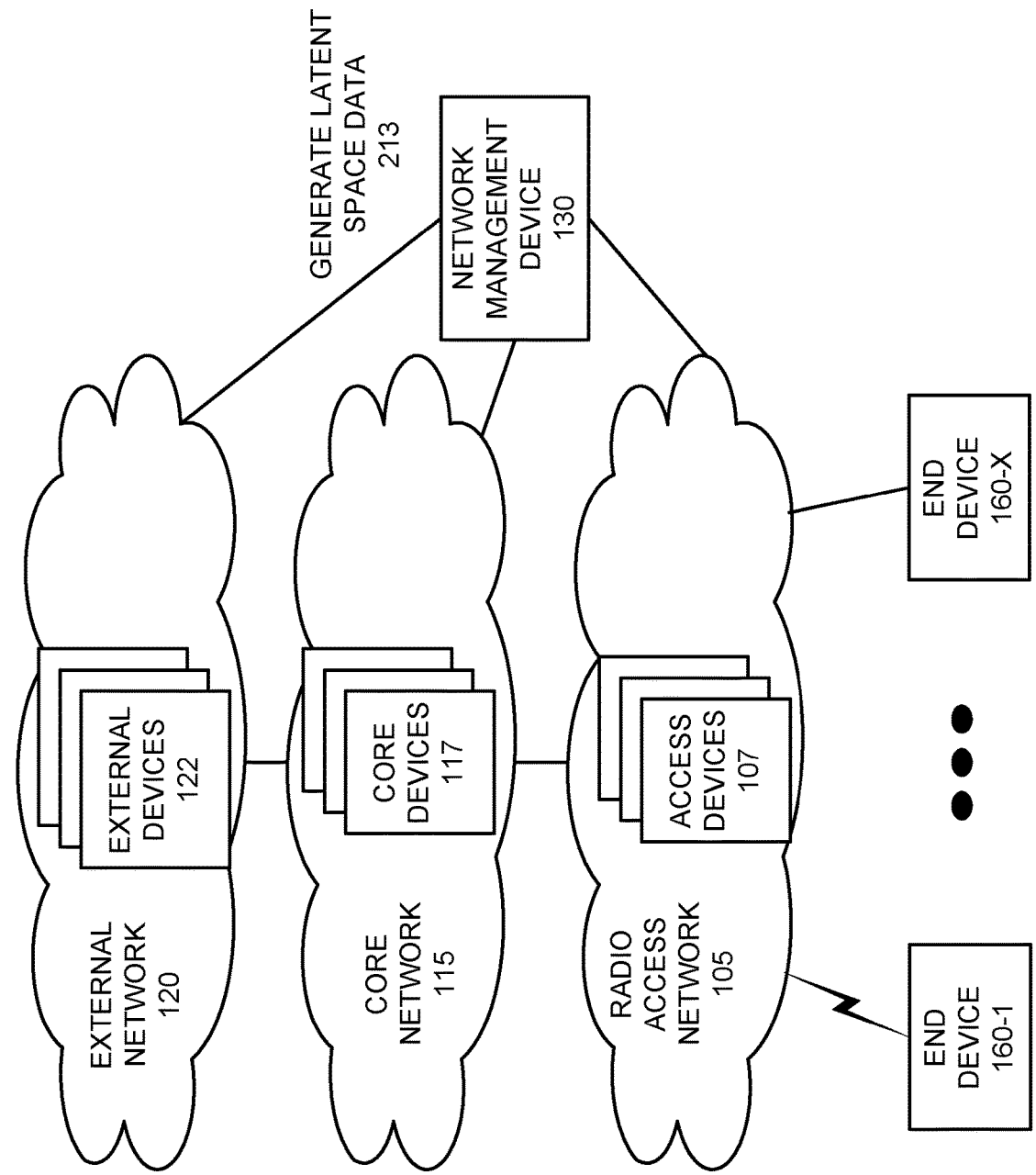

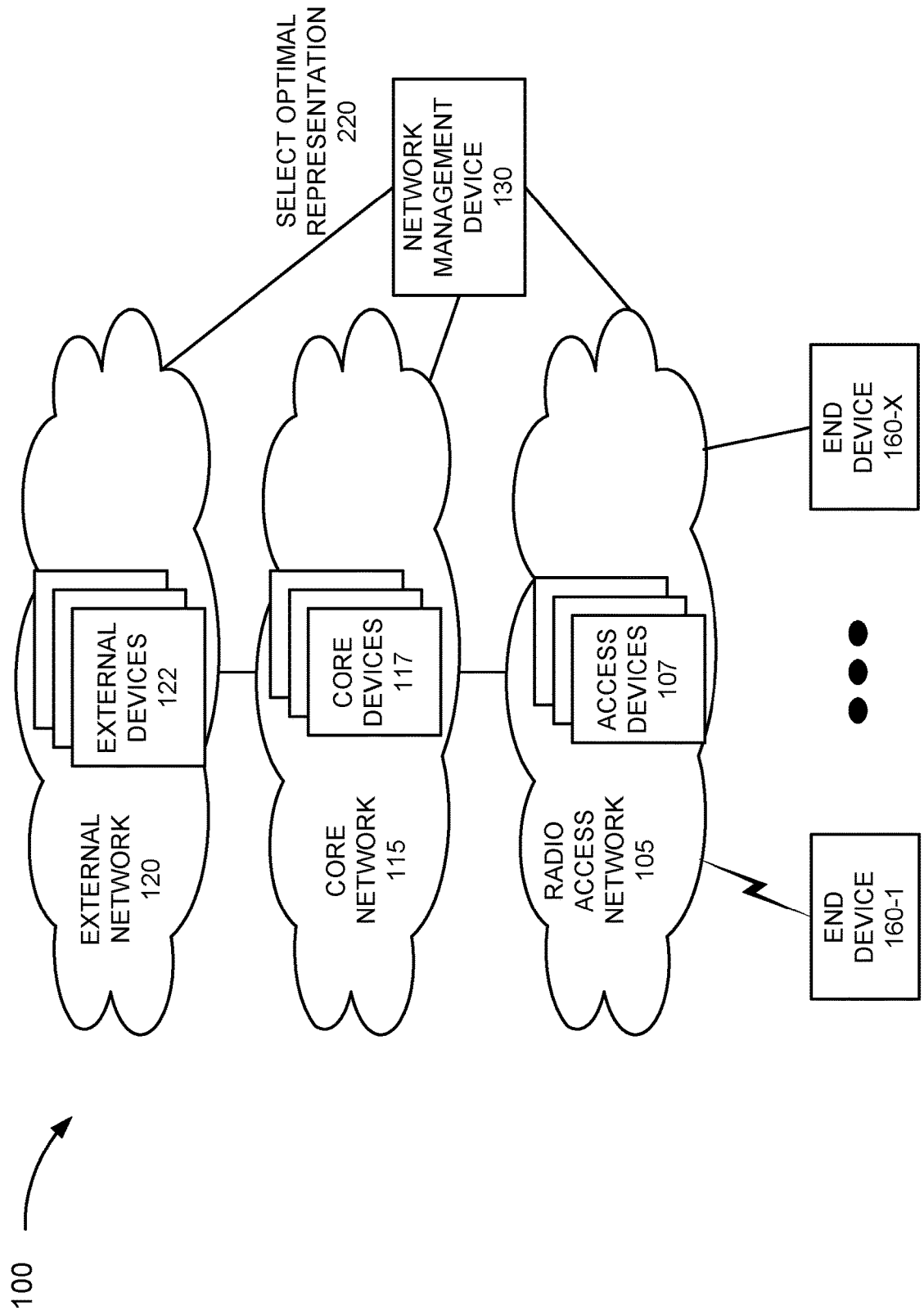

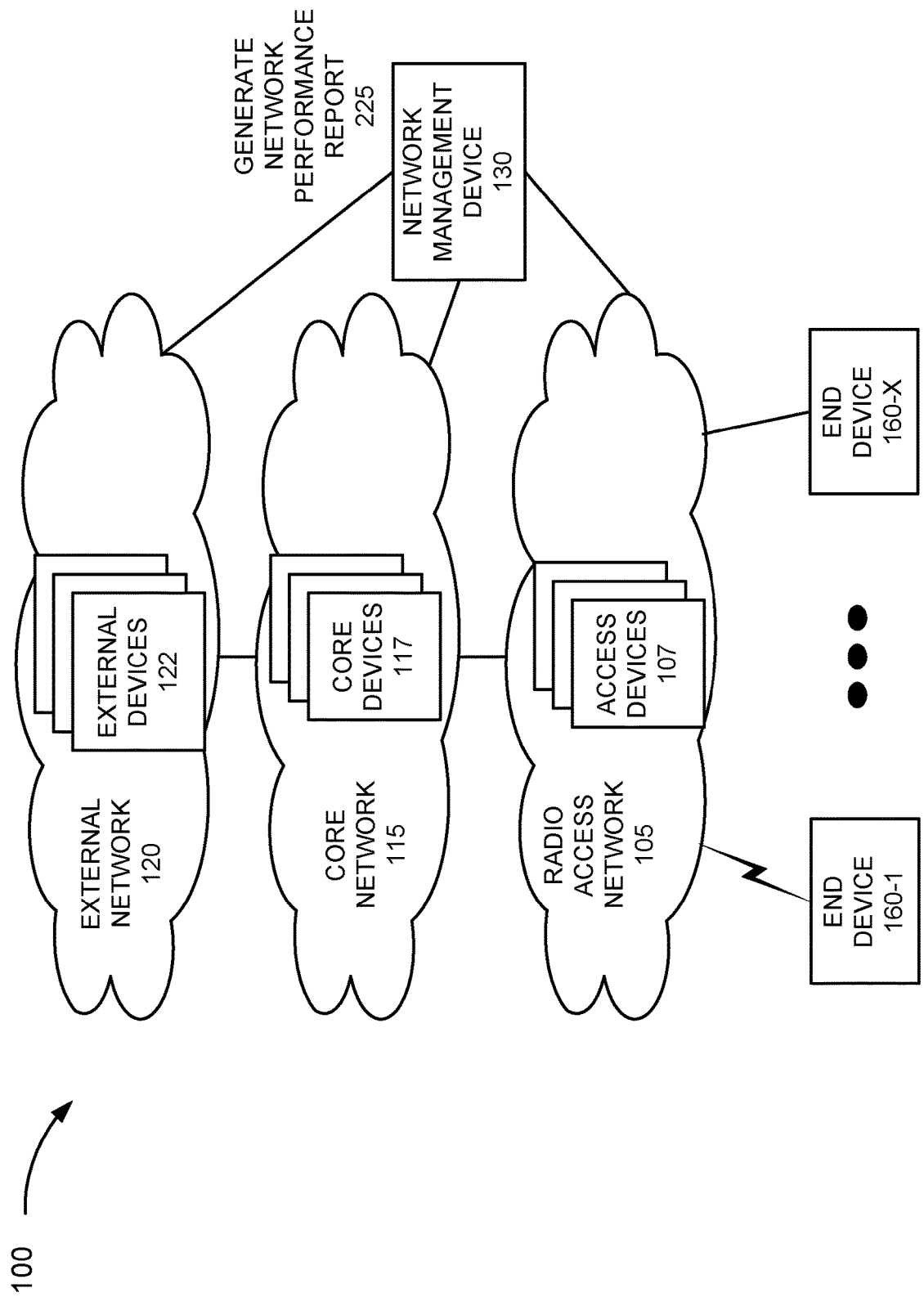

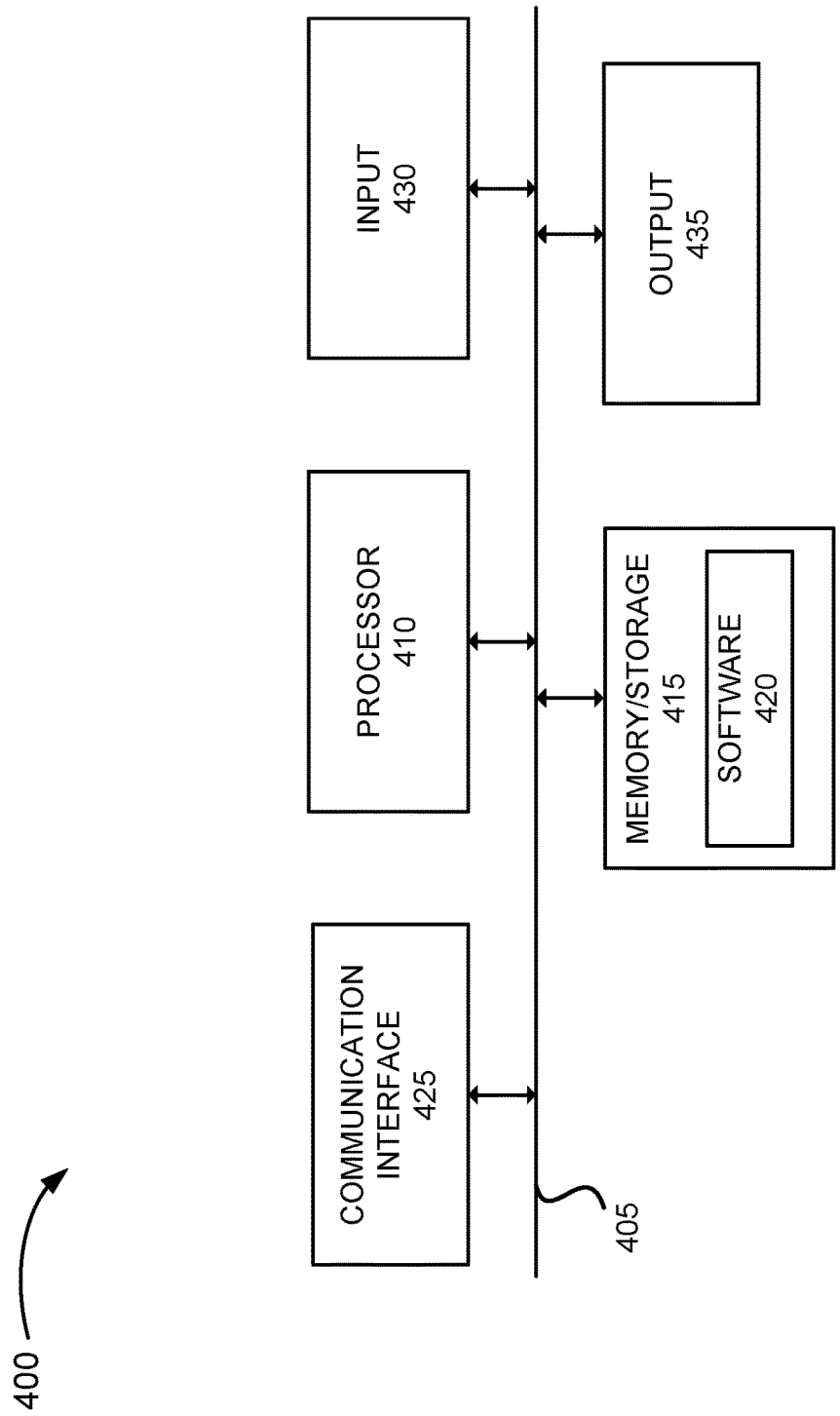

METHOD AND SYSTEM FOR ANOMALY DETECTION AND NETWORK DEPLOYMENT BASED ON QUANTITATIVE ASSESSMENT

CROSS REFERENCE TO RELATED APPLICATION

This patent application is a continuation of U.S. patent application Ser. No. 16/279,537, entitled "METHOD AND SYSTEM FOR ANOMALY DETECTION AND NETWORK DEPLOYMENT BASED ON QUANTITATIVE ASSESSMENT" and filed on Feb. 19, 2019, the disclosure of which is incorporated herein by reference in its entirety.

BACKGROUND

Various service and traffic anomalies present different behaviors in end devices, network devices of a network, and networks. Anomaly detection is an essential element in network performance management.

BRIEF DESCRIPTION OF THE DRAWINGS

FIGS. 2A-2F are diagrams illustrating an exemplary process of the validation and anomaly detection service;

FIG. 4 is a diagram illustrating exemplary components of a device that may correspond to one or more of the devices illustrated herein;

DETAILED DESCRIPTION OF PREFERRED EMBODIMENTS

Figure 1:
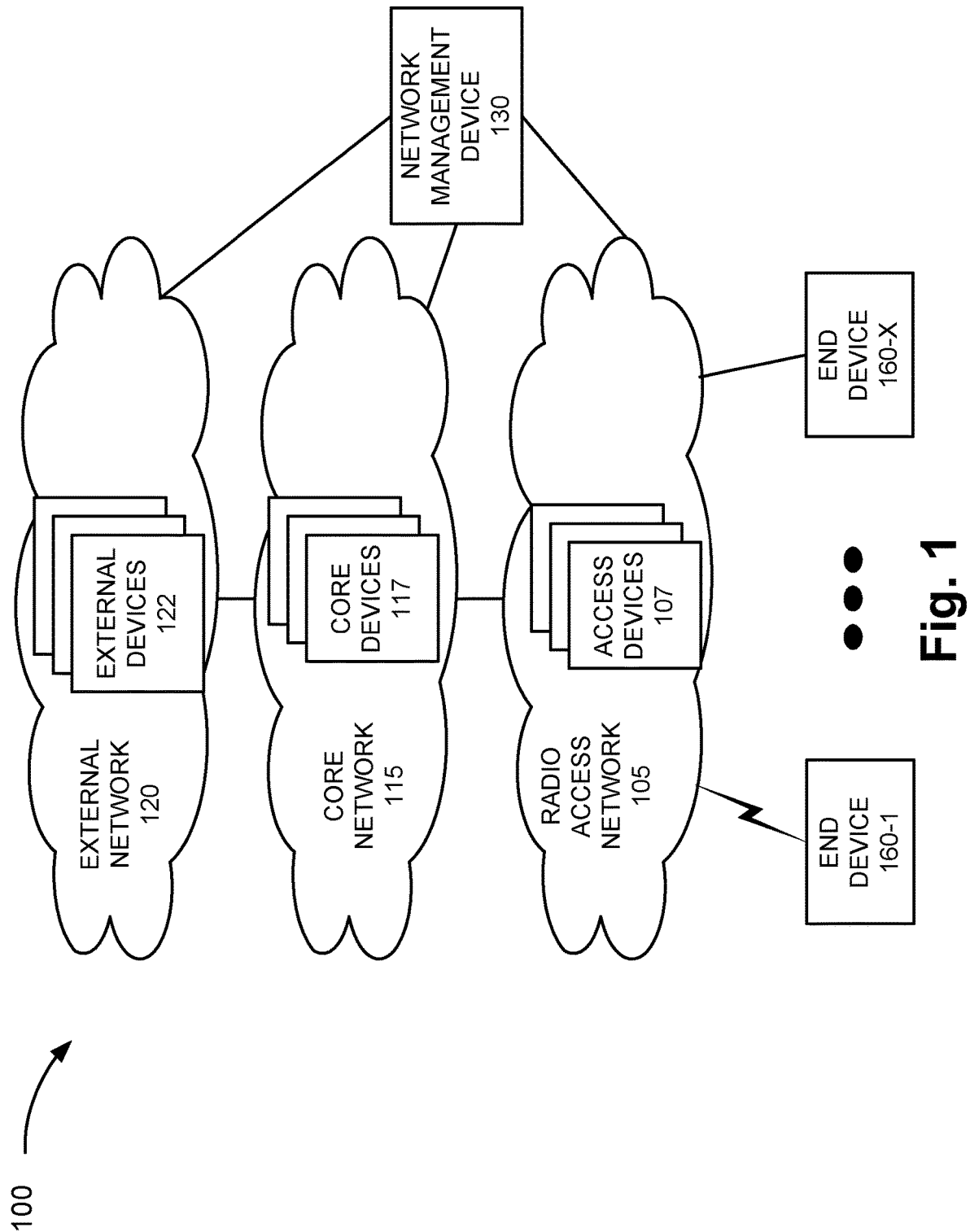
FIG. 1 is a diagram illustrating an exemplary environment in which an exemplary embodiment of a validation and anomaly detection service may be implemented.

The following detailed description refers to the accompanying drawings. The same reference numbers in different drawings may identify the same or similar elements. Also, the following detailed description does not limit the invention.

Typically, humans identify network anomalies by looking at event/alarm data or time-series key performance indicators (KPIs). Deep learning and generative models have been applied to computer vision where validation of generative model results applied to network data is performed by humans using images (e.g., 3D arrays). However, the validation process of the generative model is not feasible for humans to perform because of the high dimensionality (e.g., up to hundred or more performance metric attributes) of network data. Additionally, by virtue of human validation, the process rests on a subjective assessment. Additionally, current univariate and bivariate statistical techniques cannot be applied while multivariate statistical analysis is still a research topic. Additionally, other techniques, such as clustering methods (e.g., K-mean, etc.) that can handle multiple relations between multiple variables simultaneously suffer from a dimensionality problem in which the notion of a neighborhood becomes meaningless due to high-dimensional data sparsity.

According to exemplary embodiment, a generative model validation and anomaly detection service is described. According to an exemplary embodiment, the service includes validating the output of a generative model that relates to input network data, as described herein. For example, the network data may include device profile data pertaining to a network device, performance/traffic data, and other types of data, as described herein. According to an exemplary embodiment, the validation process includes comparing high-dimensional latent space representations of network data output by a generative model with the original input data using unsupervised learning. According to an exemplary embodiment, the validation process includes quantitatively assessing the network data latent space based on quantitative criteria, as described herein. According to an exemplary embodiment, the validation process may select an optimal number of dimensions of the network data latent space to be used for identifying whether or not a value of a performance indicator is anomalous, as described herein. For example, the performance indicator may be a key performance indicator (KPI) or other types of network performance metrics that may correlate and/or impact a Quality of Experience (QoE) Score, a Mean Opinion Score (MOS), or other values associated with users and/or network services.

According to an exemplary embodiment, the anomaly detection service provides anomaly detection for network data. According to an exemplary embodiment, the anomaly detection service includes a generative model that has been validated according to a validation service, as described herein. According to an exemplary embodiment, the anomaly detection service may be used to identify network configuration data that yields the best performance indicator values. According to an exemplary embodiment, the generative model may be used to predict network configuration data that may yield the best performance indicator values relating to a prospective or candidate network site. For example, the generative model may select network configuration data for a new cell site deployment.

As a result of the foregoing, a validation service may improve network performance management based on the quantitative validation of the generative model. For example, the validation service may more accurately tune the generative model, and in turn, allows the generative model to more accurately detect anomalies associated with network performance indicators, relative to existing approaches and systems. Additionally, the validation service can configure the generative model in an automated manner, which may reduce utilization of various resources (e.g., network management devices, etc.). The anomaly detection service may also improve network performance management by using the validated generative model to identity network configuration data that optimizes network performance indicators, and use the identified network configuration data to minimize the occurrence of anomalies relative to existing deployments of network devices, or apply the identified network configuration data to prospective geographic areas for new network service deployments.

FIG. 1 is a diagram illustrating an environment 100 in which an exemplary embodiment of an anomaly detection and remedy service may be implemented. As illustrated, environment 100 includes a radio access network (RAN) 105, a core network 115, an external network 120, and a network management device 130. Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

The number and arrangement of devices in environment 100 are exemplary. According to other embodiments, environment 100 may include additional devices and/or differently arranged devices, than those illustrated in FIG. 1. The number and arrangement of networks in environment 100 are exemplary.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

Environment 100 includes links between the networks and between the devices. Environment 100 may be implemented to include wired, optical, and/or wireless links among the devices and/or the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Radio access network 105 includes one or multiple networks of one or multiple types. For example, radio access network 105 may be implemented to include a terrestrial network. For example, the terrestrial network may include a Third Generation (3G) RAN, a 3.5G RAN, a Fourth Generation (4G) RAN, a 4.5G RAN, or a future generation RAN (e.g., a Fifth Generation (5G) RAN, or another generation RAN). By way of further example, radio access network 105 may include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Radio access network 105 may also include other types of networks, such as a WiFi network, a local area network (LAN), a personal area network (PAN), or other type of network that provides access to or can be used as an on-ramp to core network 115 and external network 120.

According to various exemplary embodiments, radio access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, radio access network 105 may be implemented according to various wireless technologies (e.g., radio access technology (RAT), etc.), wireless standards, wireless frequencies, bands, and carriers. Additionally, radio access network 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, radio access network 105 may include one or multiple types of access devices 107. For example, access devices 107 may be implemented to include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), a base station (BS), a base transceiver station (BTS), or another type of wireless node (e.g., a WiFi device, a WiMax device, a hot spot device, etc.) that provides a wireless access service. According to an exemplary embodiment, access devices 107 include logic that allows network management device 130 to obtain one or multiple types of network management data, as described herein.

Core network 115 includes one or multiple networks of one or multiple types. For example, core network 115 may be implemented to include a terrestrial network. According to an exemplary implementation, core network 115 includes a complementary network pertaining to the one or multiple RANs described. For example, core network 115 may include the core part of an LTE network, an LTE-A network, an LTE-A Pro network, a 5G network, a future generation network, a CDMA network, a GSM network, and/or another type of legacy network.

Depending on the implementation, core network 115 may include various types of network devices, such as core devices 117. For example, core devices 117 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and/or other types of network devices pertaining to various network-related functions that facilitate the operation of core network 115. According to other exemplary implementations, core devices 117 may include additional, different, and/or fewer network devices than those described. According to an exemplary embodiment, core devices 117 include logic that allows network management device 130 to obtain one or multiple types of network management data, as described herein.

External network 120 includes one or multiple networks of one or multiple types. For example, external network 120 may be implemented to provide an application and/or a service to end device 160. For example, external network 120 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a Public Switched Telephone Network (PSTN), a Signaling System No. 7 (SS7) network, a telephone network, a Voice-over-IP network, a private network, a public network, a telecommunication network, an IP network, a wired network, a wireless network, or some combination thereof. Depending on the implementation, external network 120 may include various network devices, such as external devices 122, which provide various applications, services, assets, or the like, such as servers (e.g., web, application, cloud, etc.), mass storage devices, and/or other types of network devices pertaining to various network-related functions. According to an exemplary embodiment, external devices 122 include logic that allows network management device 130 to obtain one or multiple types of network management data, as described herein.

Network management device 130 includes a network device that has computational and communication capabilities. According to an exemplary embodiment, network management device 130 includes logic that provides the validation and anomaly detection service, as described herein. Although network management device 130 is depicted outside of radio access network 105, core network 115, and external network 120, such an illustration is exemplary. According to other exemplary implementations, network management device 130 may reside in one or multiple of these exemplary networks. Additionally, although network management device 130 is depicted as having links to each of radio access network 105, core network 115, and external network 120, such an illustration is exemplary. According to other exemplary implementations, network management device 130 may have fewer, additional, and/or different links. Network management device 130 is further described herein.

End device 160 includes a device that has computational and communication capabilities. End device 160 may be implemented as a mobile device, a portable device, or a stationary device. End device 160 may be implemented as a Machine Type Communication (MTC) device, an Internet of Things (IoT) device, an enhanced MTC device (eMTC) (also known as Cat-M1), a NB-IoT device, a machine-to-machine (M2M) device, a user device, customer premise equipment that provides network access, or some other type of end node. By way of further example, end device 160 may be implemented as a smartphone, a personal digital assistant, a tablet, a netbook, a phablet, a laptop computer, a wearable device, a set top box, a router, a network termination unit, an infotainment system in a vehicle, a smart television, a game system, a music playing system, or some other type of device. According to various exemplary embodiments, end device 160 may be configured to execute various types of software (e.g., applications, programs, etc.). The number and the types of software may vary from one end device 160 to another end device 160. According to an exemplary embodiment, end device 160 includes logic that allows network management device 130 to obtain one or multiple types of network management data, as described herein.

Figure 2B:
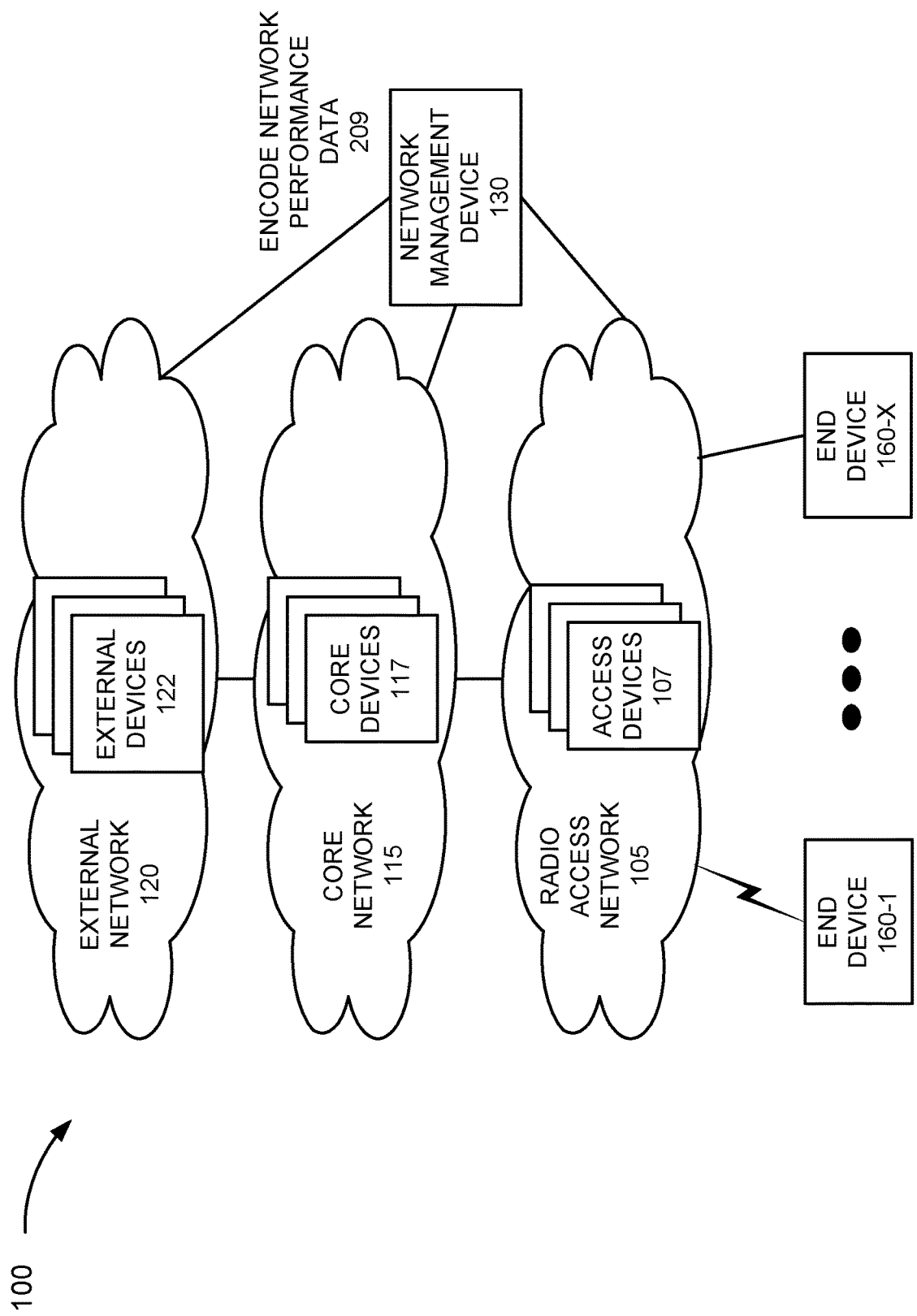

FIGS. 2A-2F are diagrams illustrating an exemplary process of the validation and anomaly detection service. Referring to FIG. 2A, according to an exemplary scenario, network management device 130 obtains network performance data 205 pertaining to access devices 107. For example, network performance data 207 may include various types of subscriber event information pertaining to wireless access service. By way of further example, various system tools (not illustrated), such as a performance tool, and/or other types of system measurement and analytics tools that may collect data pertaining to the operation and performance of access devices 107/RAN 105.

According to an exemplary embodiment, network performance data 207 may include performance indicator data (e.g., KPIs, network performance metrics that correlate to QOE, MOS, Quality of Service (QoS) values, etc.). For example, the performance indicator data may indicate values relating to the performance associated with user sessions, connections, channels, messaging (e.g., protocol level, etc.), bit rates, packet error loss rate, and other performance indicators of the wireless service in relation to access devices 107/RAN 105.

According to various exemplary embodiments, network performance data 207 may pertain to a single access device 107, multiple access devices 107 (e.g., a subset of all access devices 107), or all access devices 107. Additionally, or alternatively, network performance data 207 may pertain to access devices 107 associated with other types of criteria, such as carrier (e.g., carrier frequency, sector of a cell, etc.), type of RAT, geographic location of access device 107, time period (e.g., day, day and time period, etc.), type of access device 107 (e.g., eNB versus gNB, etc.), and/or other types of factors (e.g., city versus rural, high versus low density, etc.) that may indicate a characteristic or an attribute pertaining to access device 107.

According to other exemplary embodiments and scenarios, network performance data 207 may pertain to core devices 117, external devices 122, or some combination of access devices 107, core devices, and/or external devices 122. Further, in similar fashion, other types of criteria, such as type of core device 117 (e.g., MME versus AMF, etc.), time period, type of RAT (e.g., 4G versus 5G, etc.), geographic location to which core device 117 serves, and so forth, may be used to further specify network performance data 207. Also, for example, network performance data 207 may include characteristic data pertaining to access device 107 (or core device 117, etc.), such as make/model information, specifications pertaining to various resources (e.g., processor, memory, type of antenna, etc.), configuration data (e.g., height of antenna from the ground, etc.), terrain of an area (e.g., buildings, open field, trees, houses, telephone poles, etc.), materials and dimensions of buildings (e.g., brick, 5 story building, etc.), season (e.g., fall, summer, etc.), and/or other applicable parameters that may pertain to a wireless service area.

Additionally, for example, network performance data 207 may include geographic information associated with wireless service areas, and location information pertaining to access devices 107. For example, the geographic information may include map data, and the location information may indicate where access devices 107 reside relative to the map data. Network performance data 207 may further include unique identifiers for access devices 107 and day and timestamp data associated with various instances of network performance data 207.

Figure 3A:
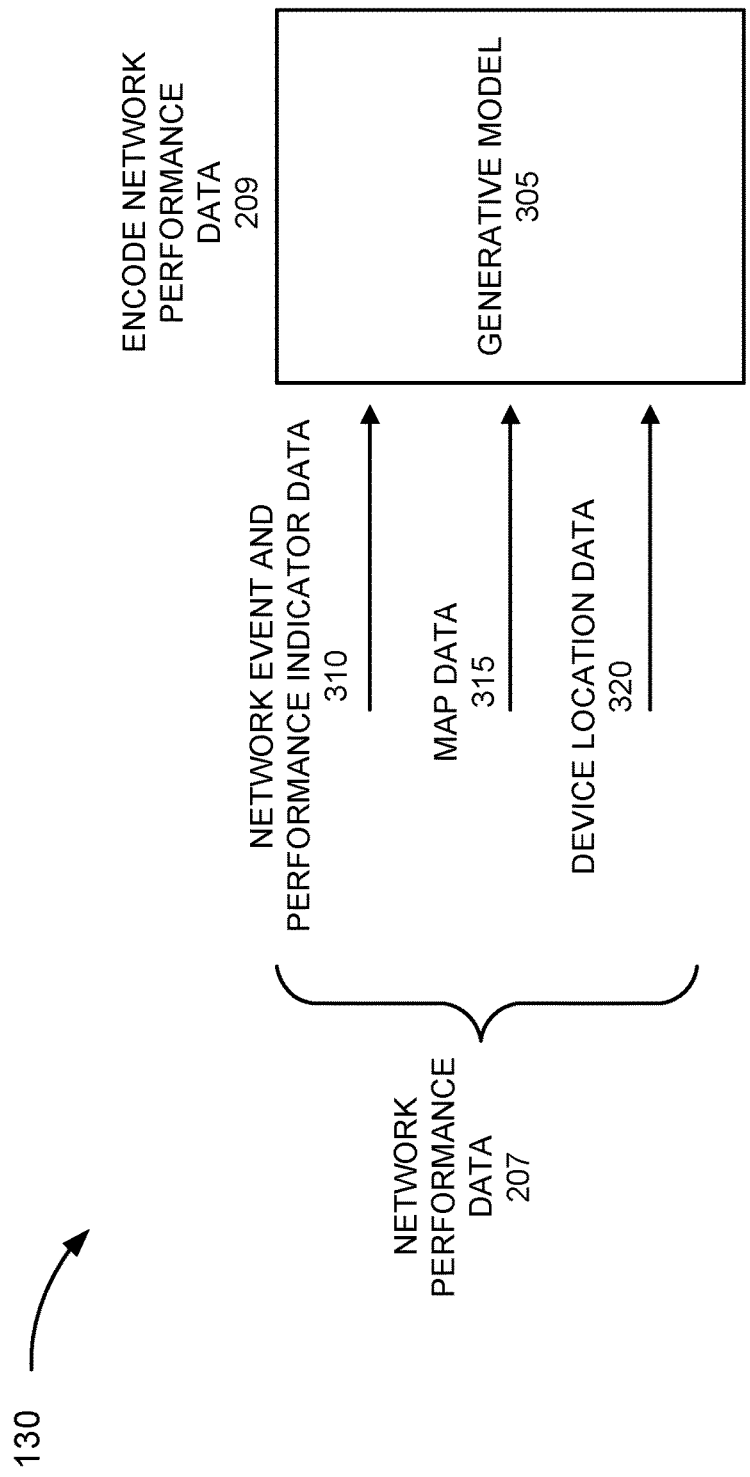
FIGS. 3A-3E are diagrams illustrating exemplary operations of the process of the validation and anomaly detection service.

Referring to FIG. 2B, in response to obtaining network performance data 205, network management device 130 may encode the network performance data 209. For example, referring to FIG. 3A, according to an exemplary embodiment, network management device 130 includes a generative model 305. For example, generative model 305 may include a Generative Adversarial Network (GAN), an autoencoder, a variational autoencoder, a Markov Chain, a neural network, and/or other types of models that may support unsupervised learning (e.g., a non-probabilistic model, a probabilistic model). As illustrated, generative model 305 may ingest as input network performance data 207, such as network event and performance indicator data 310, map data 315, and device location data 320 that pertain to access devices 107.

Generative model 305 may include logic that encodes the input data (e.g., network performance data 207). For example, the input data D may have n dimensions (e.g., D: $X_1 \ldots X_n$) in which each dimension may relate to a performance indicator (e.g., KPI, etc.). According to various exemplary scenarios, the dimensionality of the input data D may be high (e.g., tens, a hundred, over a hundred, etc.). Generative model 305 may reduce the number of dimensions based on an encoding process. For example, generative model 305 may include a neural network, multiple cooperative neural networks, such as autoencoders and GANs, a Gaussian Mixture Model (GMM) or another type of probabilistic model to encode the input data D. By way of example, assume that the input data D has 200 dimensions (e.g., 200 eNB KPIs). Generative model 305 may encode the input data D such that the input data D may be represented in 20 dimensions or some other lower value of dimensions relative to 200.

Figure 3B:
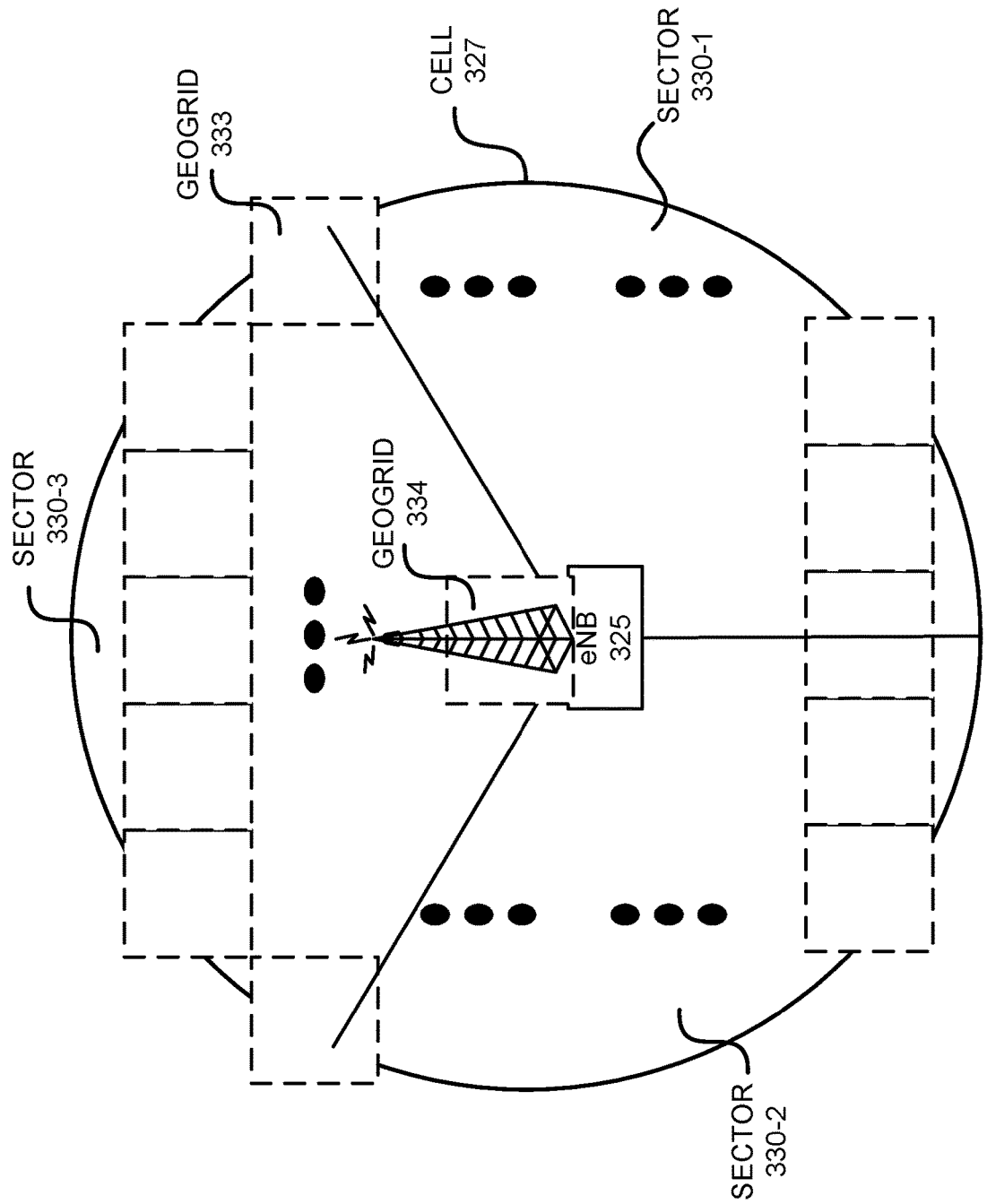
Figure 3C:
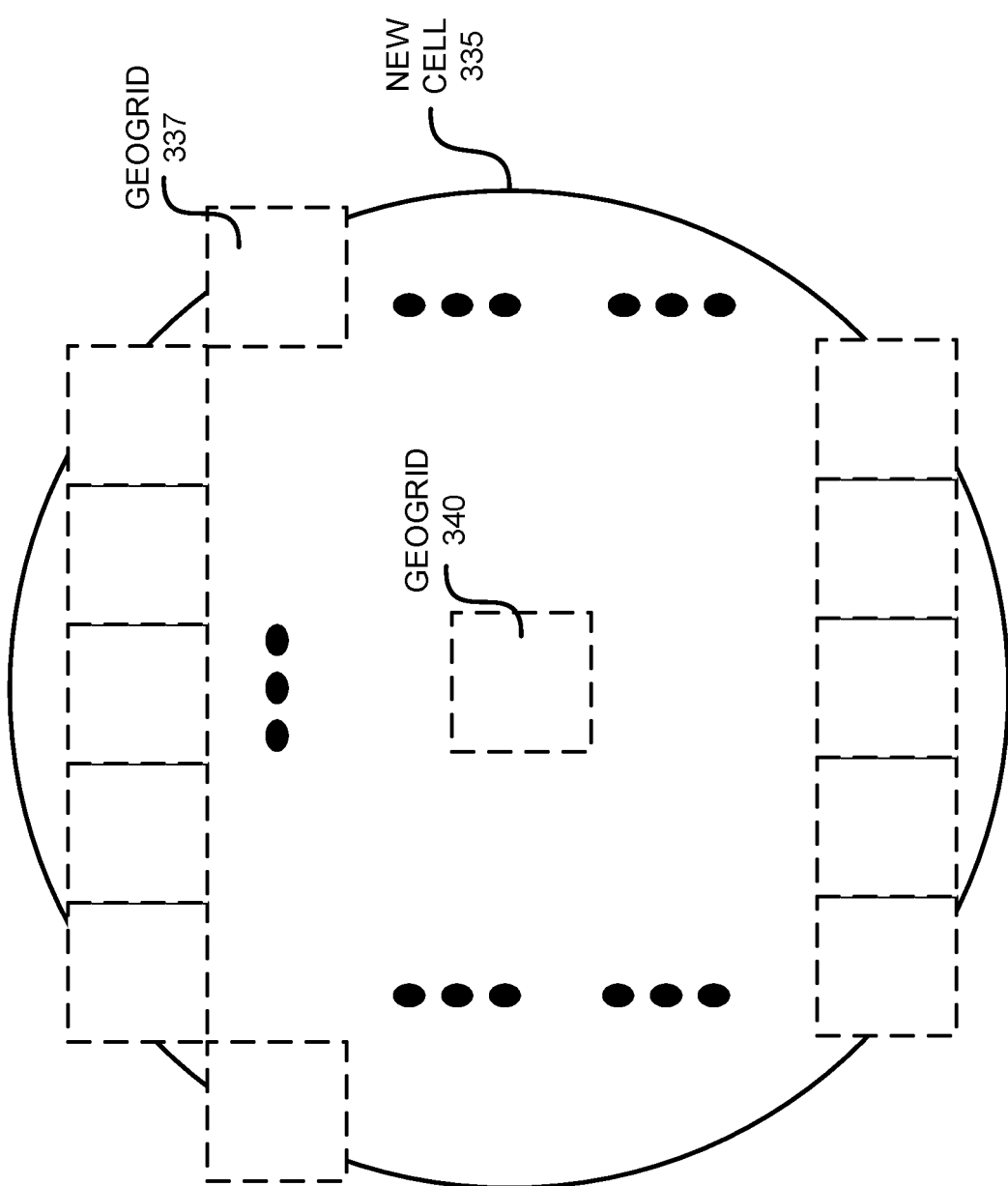

Referring to FIG. 2C, network management device 130 may generate latent space data 213 based on the encoded network performance data. For purposes of description, the latent space data may also be referred to as data G with n dimensions (e.g., G: $Y_1 \ldots Y_n$). The latent space data may correspond to a learning representation of network performance data occurrences. For example, referring to FIG. 3B, assume that the network performance data 207 includes data pertaining to access device 107 (e.g., eNB 325). However, the network performance data and subsequently generated encoded data pertain to the performance at access device 107 and may not be representative of performance within the wireless service area. For example, eNB 325 may provide wireless service within a cell area 327. According to some exemplary implementations, cell 327 may be divided into two or more sectors, such as for example, sectors 330-1, 330-2, and 330-3. According to some exemplary implementations, eNB 325 may use different carrier frequencies depending on the sector. In view of this exemplary configuration, cell area 327 and/or sector 330 may be sub-divided into smaller geographic areas, such as geogrid areas 333. According to other examples, depending on the type of access device 107 (e.g., a gNB, etc.), the shape and size of the cell, the number of sectors, and the shape and/or size of the geogrid areas may be different.

According to an exemplary embodiment, network management device 130 may generate latent space data for one or multiple geogrid areas 333, which are different from a geogrid area 334 at which eNB 325 is located, that indicates network performance within each geogrid area 333.

According to other exemplary embodiments, network management device 130 may generate latent space data for a new prospective cell area 335. For example, in the context of cell site planning or future provisioning of wireless service at a locale, network management device 130 may generate latent space data that indicates predictive network performance data within geogrid areas 337 of new cell area 335 and/or within geogrid area 340 at which a new access device 107 may be deployed. The reconstruction and prediction of geogrid radio maps may be generated to relate a geographic location, not only to a given system parameter (e.g., path loss, etc.), but to a generic and/or new latent dimension that captures a certain radio behavior, which may be difficult to identify using traditional statistical or machine-learning approaches on the raw data. According to another example, the reconstruction and predication of load and capacity maps may be generated based on a latent feature.

Figure 2D:
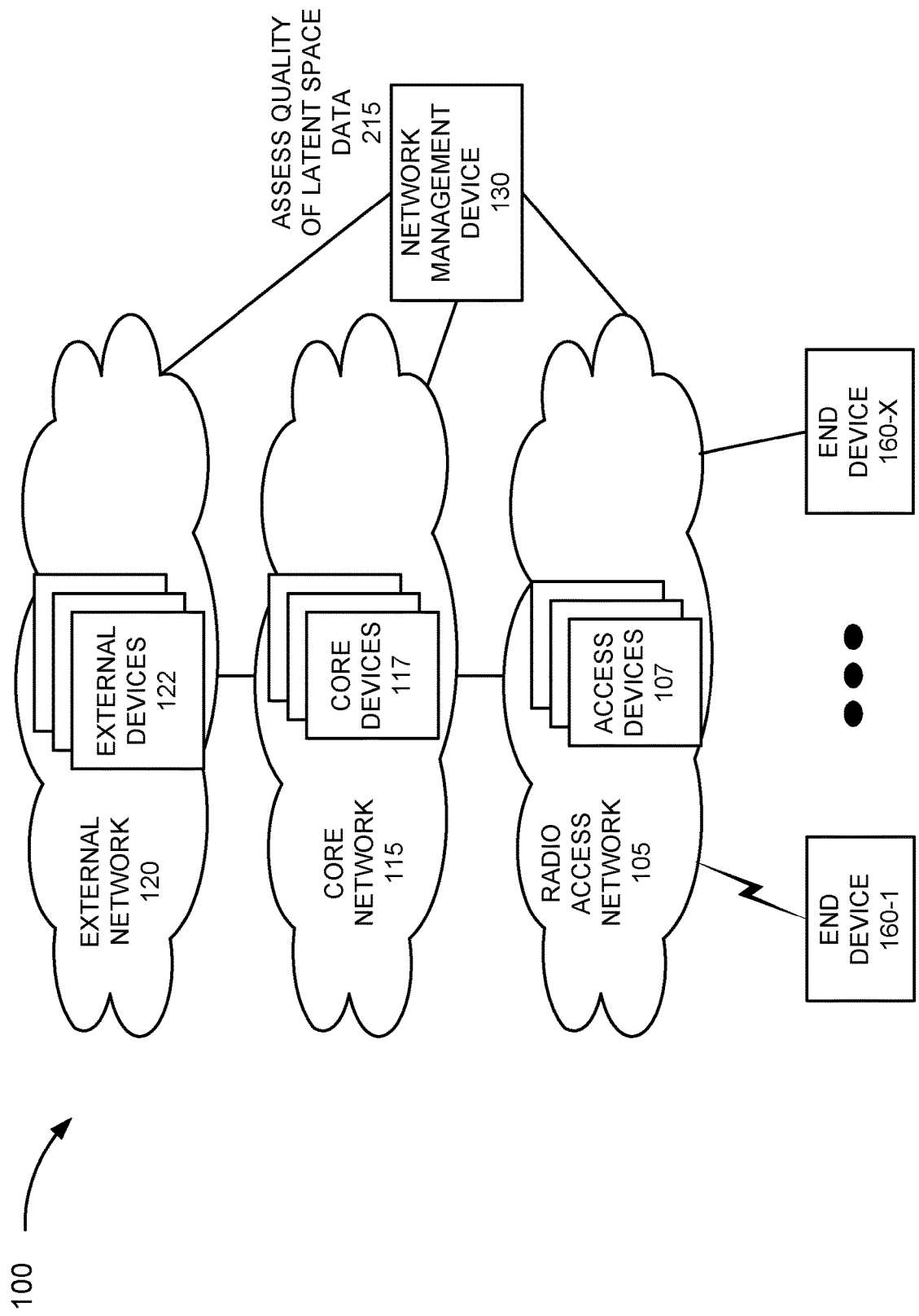
Figure 3D:
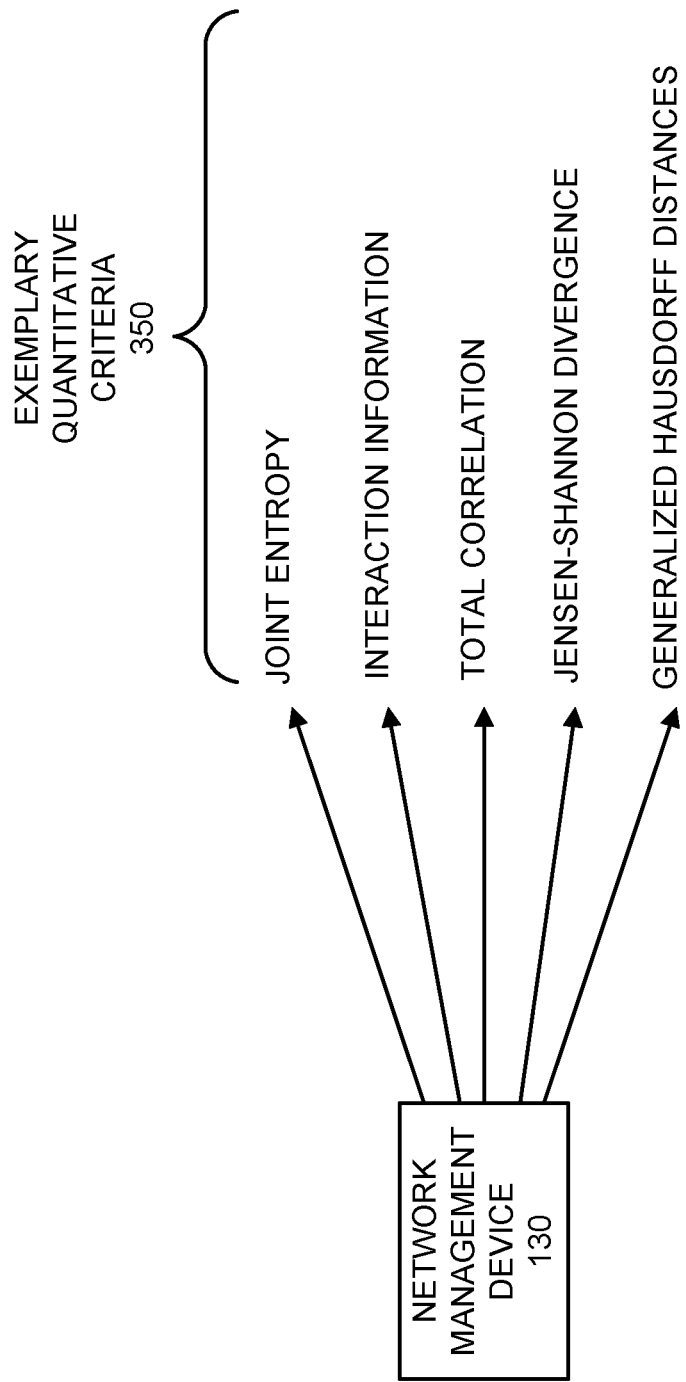

Referring to FIG. 2D, network management device 130 may assess the quality of the latent space data. For example, network management device 130 may quantitatively analyze the output space data to determine an optimal representation of the input space data by the output space data. The output data may include the latent space data and decoded latent space data. The decoded latent space data may be of the original number of dimensions prior to encoding or another number of increased dimensions relative to the number of dimensions of the encoded network performance data. According to an exemplary embodiment, as previously described, a validation process includes quantitatively assessing the network data latent space based on quantitative criteria. According to various exemplary embodiments, the validation process may include the use of one or multiple quantitative criteria. According to some exemplary implementations, the type of performance indicator (e.g., the type of KPI, etc.) may be correlated to certain quantitative criteria. As an example, referring to FIG. 3D, network management device 130 may calculate various quantitative values based on the input data D, the output data G, and exemplary quantitative criteria 350. According to an exemplary implementation, exemplary quantitative criteria 350 may include joint entropy, interaction information, total correlation, Jensen-Shannon divergence, and/or generalized Hausdorff distances. According to other exemplary implementations, other types of quantitative criteria may be used, such as Minimum Covariance Determinant (MCD)-based Mahalanobis distances.

For the sake of description, exemplary expressions pertaining to the exemplary quantitative criteria are described. For example, joint entropy H is a measure of the uncertainty associated with a set of variables as the entropy of the probability of jointly observing outcomes $(x_1, x_2, \ldots, x_n)$ of n random variables $(X_1, X_2, \ldots, X_n)$, where n is greater than two, which may be calculated based on the following exemplary expression:

$$H(X_1, X_2, \ldots, X_n) = -\Sigma_{x \in X_1} \ldots, _{x \in X_n} p(x_1, x_2, \ldots, x_n) \log_2(p(x_1, x_2, \ldots, x_n)) \quad (1),$$

in which $x_1, x_2, \ldots$ are particular values of $X_1, X_2$, etc., and $p(x_1, x_2, \ldots, x_n)$ is the probability of these values occurring together.

Interaction information (II) on variable set $X-(X_1, X_2, \ldots, X_n)$ based on the following exemplary expressions:

$$II(X) = -\Sigma_{x \in X_n}(-1)^{|X|-|x|} H(x) \text{ where } |X| = n \quad (2),$$

in which H(x) is the information entropy of $X_1$, where $i=1, \ldots, n$. As a result, the calculated interaction information may indicate intra-space performance indicator relations (e.g., KPI relations, etc.) and cross-space performance indicator relations (e.g,. II(D) and II(G) and cross-space combinations. For example, the calculated interaction information may indicate given two KPIs in input data x and y—who much of the uncertainty of x is removed when y is known, or how much of the uncertainty of x is removed when y is known in the generated data. Additionally, in addition to interaction information, univariate quantities (e.g., maximal information coefficient (MIC) between the same variable in the input data and the output data) may also be calculated. For example, the maximal information coefficient for a KPI of input data D and the maximal information coefficient for the same KPI of data G may be calculated.

Total correlation (TC) may indicate a measure of the difference between distributions (e.g., relative entropy). For example, the total correlation TC(X) on variable set $X=(X_1, X_2, \ldots, X_n)$ may be calculated based on the Kullback-Leibler divergence (KLD) from a joint distribution $p(X_1, X_2, \ldots, X_n)$ to an independent distribution $p(X_1)p(X_2) \ldots p(X_n)$, which may be calculated according to the exemplary expression:

$$TC(X) = KLD(p(X_1, X_2, \ldots, X_n) \| p(X_1) p(X_2) \ldots p(X_n)) \quad (3),$$

or a reduction to a difference of entropies, as set forth in the exemplary expression:

$$TC(X) = \sum_{x \in X} H(x) - H(X) - H(X_1; X_2; \ldots; X_n) \quad (4),$$

in which H(x) is the information entropy of $X_i$, where i=1, ..., n, $H(X_1, X_2; \ldots; X_n)$ is the joint entropy of the variable set X; and TC(D) and TC(G) are calculated.

Jensen-Shannon divergence (JSD) may be used to measure the similarity between two probability distributions. For example, the JSD(X) on variable set $X=(X_1, X_2, \ldots, X_n)$ may be calculated according to the exemplary expression: $K^{th}$ $$JSD\pi_{x \in X}(X) = H(\sum_{x \in X} \pi_x x) - \sum_{x \in X} \pi_x H(x) \quad (5),$$

in which $\pi_x$ are weights that are selected for the probability $(X_1, X_2, \ldots, X_n)$, H(x) is the information entropy of $X_i$, where i=1, ..., n, and for the two-distribution case, X1=P, X2=Q, $$\pi_x = 1/2, \, JSD(P \| Q) = \frac{KLD(P \| M) + KLD(Q \| M)}{2},$$

in which $$M = \frac{P+Q}{2}.$$

In this regard, JSD(D) and JSD(G) may be calculated.

A generalized Hausdorff distance indicates a measure of how far two subsets of a metric space are from each other. For example, given the two point sets of $(X_1, X_2, \ldots, X_n)$ associated with input data D, and $(Y_1, Y_2, \ldots, Y_n)$ associated with data G, Hausdorff distances may be calculated. For example, the direct distances d(X,Y) and d(Y,X) between two point sets X and Y may be combined in four (4) ways to define twenty-four (24) undirected distance measures, according to the following exemplary expressions:

$$F_1(d(X,Y), d(Y,X)) = \min(d(X,Y), d(Y,X)) \quad (7)$$

$$F_2(d(X,Y), d(Y,X)) = \max(d(X,Y), d(Y,X)) \quad (8)$$

$$F_3(d(X,Y), d(Y,X)) = (d(X,Y) + d(Y,X))/2 \quad (9)$$

$$F_4(d(X,Y), d(Y,X)) = (n^* d(X,Y) + m^* d(d(Y,X))/(n+m) \quad (10),$$

in which there may be multiple generalized distances, such as for example:

$$d_1(X, Y) = \min_{x \in X} d(x, Y) \quad (11)$$

$$d_2(X, Y) = {}^{50} K^{th}_{x \in X} d(x, Y) \quad (12)$$

$$d_3(X, Y) = {}^{75} K^{th}_{x \in X} d(x, Y) \quad (13)$$

$$d_4(X, Y) = {}^{90} K^{th}_{x \in X} d(x, Y) \quad (14)$$

$$d_5(X, Y) = \max_{x \in X} d(x, Y) \quad (15)$$

$$d_6(X, Y) = \frac{1}{n} \sum_{x \in X} d(x, Y), \quad (16)$$

in which ${}^a K^{th}_{x \in X}$ is the $K^{th}$ ranked distance, such that n=a %. According to this exemplary implementation, the directed distances and Functions (F) may yield 24 undirected distances, as illustrated below.

|       | $F_1$ | $F_2$ | $F_3$ | $F_4$ |
|-------|-------|-------|-------|-------|
| $d_1$ | D1    | D2    | D3    | D4    |
| $d_2$ | D5    | D6    | D7    | D8    |
| $d_3$ | D9    | D10   | D11   | D12   |
| $d_4$ | D13   | D14   | D15   | D16   |
| $d_5$ | D17   | D18   | D19   | D20   |
| $d_6$ | D21   | D22   | D23   | D24   |

According to other exemplary embodiments, a different number of generalized distances and undirected distances may be calculated.

Figure 3E:
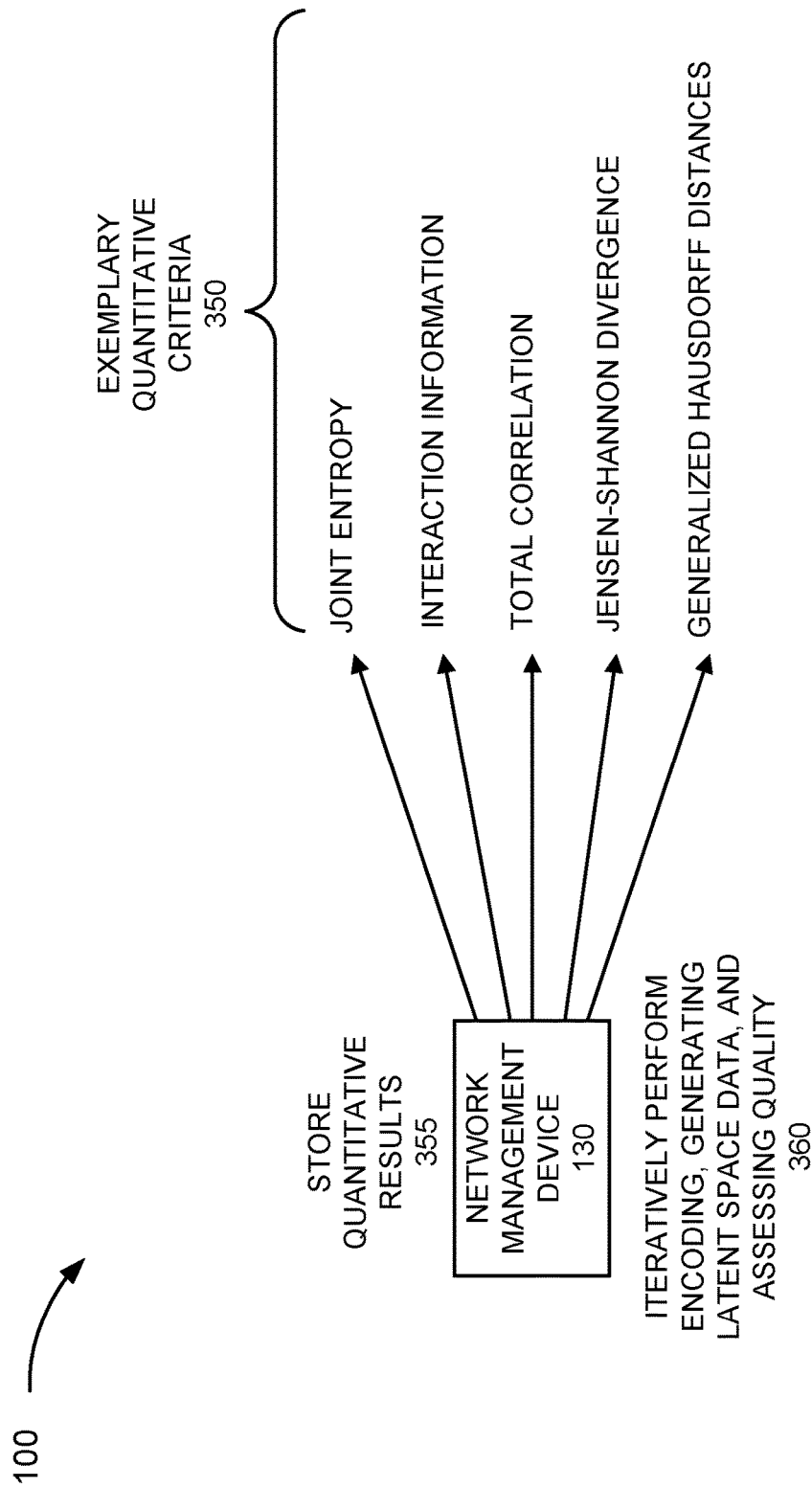

Referring to FIG. 2D and FIG. 3E, as a part o assessment process, according to an exemplary embodiment, network management device 130 may store the results of the quantitative analysis 355, and iteratively perform encoding of network performance data, generating latent space data, and assessing quality of the latent space data 360. According to an exemplary embodiment, the iterative process includes network management device 130 changing one or multiple parameters pertaining to the service, as described herein. According to various exemplary embodiments, the parameters may include the type of generative model (e.g., auto-encoder, variational encoder, GAN, etc.), neural network connectivity pattern (e.g., shallow, fully connected, convolutional, attention, recursive, long short-term memory (LSTM), etc.), neural network geometry (e.g., Euclidian, Riemannian, hyperbolic, etc.), encoding dimension (e.g., amount of reduction of dimensions between input data D and data G), disentanglement control parameter, number of hidden layers, recurrence type (e.g., space, time, space and time), loss (e.g., cross entropy, adversarial, variational, Gaussian mixture, etc.), optimizer type (e.g., Adam, stochastic gradient descent (SGD), RMSProp, Adagrad, etc.), activation function type (e.g., Rectified Linear Unit (ReLu), Sigmoid, Tanh, etc.), hyperparameters of an optimizer (e.g., learning rate, decay rate, step size, batch size, etc.), hyperparameters of neural network (e.g., number of layers, number of units at each layer, dropout rate at each layer, L1 or L2 regularization parameters, etc.), hyperparameters of a convolutional layer (e.g., window size, stride value, pooling layers, etc.), and/or other types of hyperparameters pertaining to a generative model.

Referring to FIG. 2E, after performing the iterative process, network management device 130 may select an optimal representation 220. For example, network management device 130 may select the optimal representation of dimensions of the latent space data. According to an exemplary embodiment, network management device 130 may determine the optimal representation of dimensions based on the calculated quantitative criteria values and configured threshold values.

Referring to FIG. 2F, network management device 130 may generate a network performance report 225. According to an exemplary implementation, the report may include clustering of one or more cells that exhibit the best network performance and/or one or more cells that are outliers (e.g., anomaly detection that indicates particular problems in the network). Network management device 130 may use a clustering algorithm (e.g., K-means, Density-Based Spatial Clustering of Applications with Noise (DBSCAN), Ordering Points To Identify The Clustering Structure (OPTICS), Univariate Gaussian (UVG), Multivariate Gaussian (MVG), a GMM), etc.). According to another exemplary implementations, the report may include one or multiple instances of the best or optimal predicted network performance data (e.g., KPIs, etc.) for a new cell deployment at one or multiple geogrid locations, and corresponding one or multiple different network configurations of access device 107 that yield the best or optimal predicted network performance. According to yet another exemplary implementation, the report may include data indicating the network performance for a geographic area of a wireless service area to which a new access device 107 or an existing access device 107 may serve. As a result, the reports may be used to provide remedial measures pertaining to existing deployed network devices or used to select network configurations for new wireless service areas.

FIGS. 2A-2F and 3A-3E illustrate exemplary processes of the service, according to other exemplary embodiments, the processes may include additional and/or different steps than those illustrated and described.

FIG. 4 is a diagram illustrating exemplary components of a device 400 that may be included in one or more of the devices described herein. For example, some or all of the components of device 400 may be included in network management device 130. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein. Additionally, or alternatively, according to other embodiments, multiple components may be combined into a single component. For example, processor 410, memory/storage 415, and communication interface 425 may be combined.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to network management device 130, software 420 may include an application that, when executed by processor 410, provides the functions of the validation and anomaly detection service, as described herein. Software 420 may also include firmware, middleware, microcode, hardware description language (HDL), and/or other form of instruction. Software 420 may include an operating system.

Communication interface 425 permits device 400 to communicate with other devices, networks, systems, and/or the like. Communication interface 425 includes one or multiple optical interfaces. Communication interface 425 may include one or multiple wired and/or wireless interfaces. Communication interface 425 includes one or multiple transmitters and receivers, or transceivers. Communication interface 425 may operate according to a protocol stack and a communication standard. Communication interface 425 may include one or multiple line cards. For example, communication interface 425 may include processor 410, memory/storage 415, and software 420.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
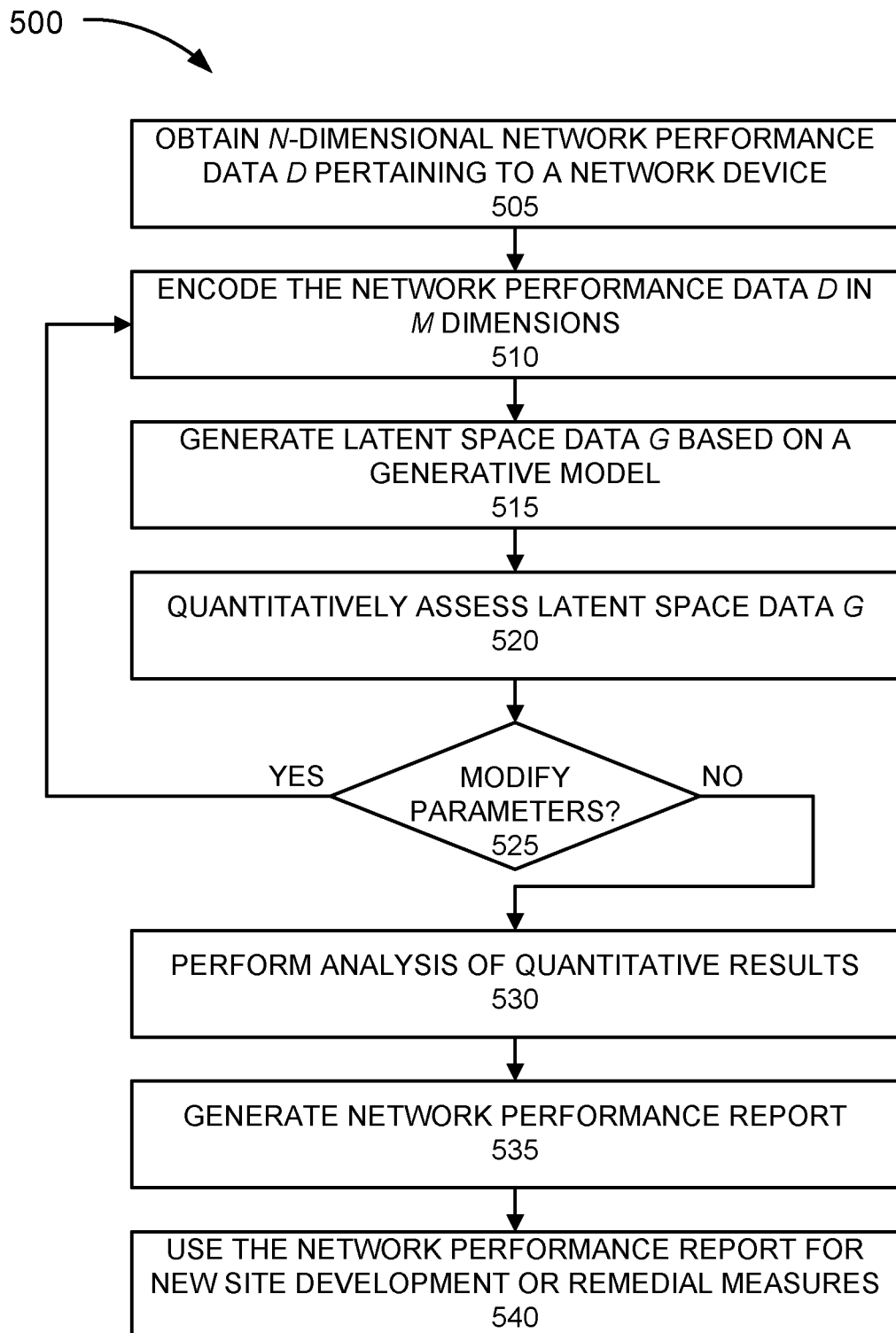
FIG. 5 is a flow diagram illustrating an exemplary process of the validation and anomaly detection service.

FIG. 5 is a diagram illustrating an exemplary process 500 of the service, as described herein. Network management device 130 performs steps of process 500. For example, processor 410 executes software 420 to perform the steps illustrated in FIG. 5, and described herein.

Referring to FIG. 5, in block 505, n-dimensional network performance data X pertaining to a network device may be obtained. For example, network management device 130 may obtain network performance data from access device 107, core device 117 and/or external device 122, a system performance tool, and/or other network management devices, as previously described.

In block 510, the n-dimensional network performance data X may be encoded in m-dimensions. For example, network management device 130 may encode the n-dimensions of the performance data indicators (e.g., KPIs, etc.) to a reduced number of m-dimensions of the performance data indicators.

In block 515, a latent space data G may be generated based on a generative model and the encoded network performance data. For example, network management device 130 may generate latent space data G that may have n dimensions based on the generative model and the encoding of the network performance data, as previously described.

In block 520, the latent space data G may be quantitatively assessed. For example, network management device 130 may quantitatively assess the latent space data G based on one or multiple quantitative measures, such as for example, divergences, distances, and/or entropy functions, as previously described. The quantitative assessment may pertain to the latent space data and a decoded latent space data. The decoding may increase the number of dimensions relative to the latent space data. For example, the number of dimensions may be increased to the number of dimensions of the network performance data (e.g., pre-encoding) or some other number of dimensions. According to an exemplary implementation, the comparison between the latent space data and the decoded latent space data may be quantitatively be assessed to find an outlier based on the distances between the latent space data and the decoded latent space data. For example, a high distance between X of the latent space data and X' of the decoded latent space data may be indicative of an outlier. Additionally, other quantitative assessments may reveal or be indicative of an outlier between these particular instances of data.

In block 525, it may be determined whether to modify one or multiple parameters. For example, network management device 130 may iteratively perform the encoding, generating, and quantitatively assessing steps in which one or multiple parameters, as described herein, may be modified. For example, network management device 130 may be configured to perform a certain number of iterations or other parameters that manage whether a next iteration is to be performed. Network management device 130 may store a result for each iteration performed.

When it is determined that the parameters may be modified (block 525—YES), network management device 130 may modify one or multiple parameters pertaining to the encoding, generating, and/or quantitatively assessing operations, and return to block 510.

When it is determined that the parameters may not be modified (block 525—NO), analysis of the quantitative results may be performed (block 530). For example, network management device 130 may select the latent space data that provides the optimal dimensions of the network performance data. By way of further example, network management device 130 may compare various parametric values of the latent space data to one or multiple threshold values. For example, a threshold value pertaining to a reconstruction error of a generative model (e.g., autoencoder) result may determine the number of potential generated anomalies to be clustered by a clustering algorithm (e.g., DBSCAN, etc.).

In block 535, a network performance data report may be generated. For example, network management device 130 may generate the network performance data report based on the result of the quantitative analysis. By way of further example, the network performance data report may indicate network configurations for network devices (e.g., access device 107, core device 117, external device 122) that yield the best or optimal network performance, in which the network devices may be currently deployed or new/future deployments. According another example, the network performance data report may include indicate network performance for a geographic area of a wireless service area to which a currently deployed or a new/future deployed network device may serve or may prospectively serve.

In block 540, the network performance data report may be used for new site development or remedial measures. For example, network planning devices may use the network performance data report to configure a new/future deployment of access device 107, core device 117, and/or external device 122. Alternatively, for example, network management devices may use the network performance report as a basis to reconfigure deployed network devices so as to improve wireless network services, or remedy detected anomalies pertaining to a network device associated with the network performance data. Network management device 130 may transmit the network performance data report to network planning devices or other network management devices. Generated network data may also be used for testing purposes or benchmarking between different regions. According to a testing scenario, for example, the generative model may operate as a network simulator.

Although FIG. 5 illustrates an exemplary process 500 of the service, according to other embodiments, process 500 may include additional operations, fewer operations, and/or different operations than those illustrated in FIG. 5, and described herein.

Figure 6:
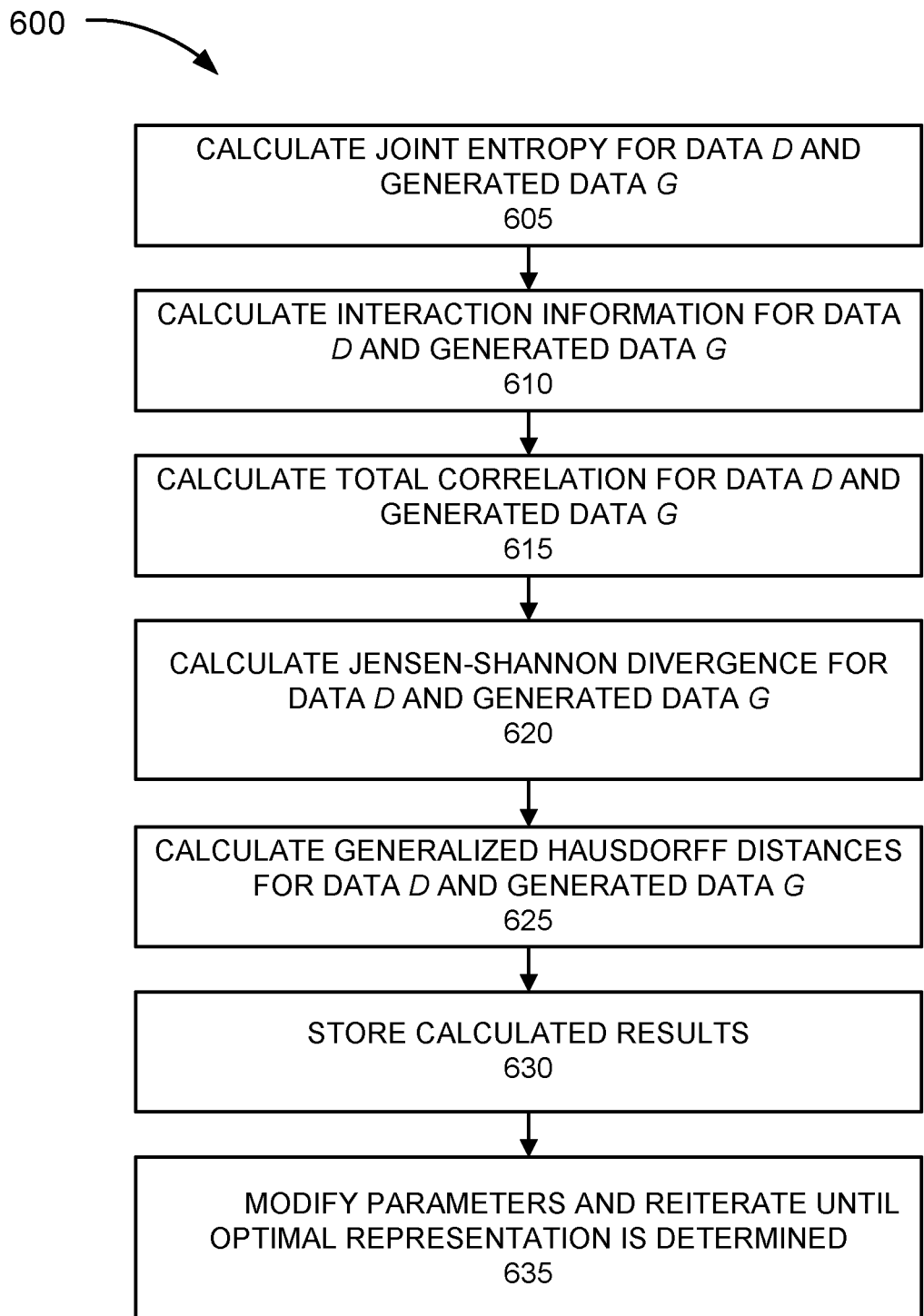
FIG. 6 is a flow diagram illustrating another exemplary process of the validation and anomaly detection service.

FIG. 6 is a diagram illustrating an exemplary process 600 of the service, as described herein. Network management device 130 performs steps of process 600. For example, processor 410 executes software 420 to perform the steps illustrated in FIG. 6, and described herein. Process 600 may include operations performed by network management device 130 in relation to blocks 520 and 525 of FIG. 5.

Referring to FIG. 6, in block 605, joint entropy for data D and G and associated performance indicator data may be calculated. In block 610, interaction information for data D and G and associated performance indicator data may be calculated. In block 615, total correlation for data D and G and associated performance indicator data may be calculated. In block 620, Jensen-Shannon divergence for data D and G and associated performance indicator data may be calculated. In block 625, generalized Hausdorff distances for data D and G and associated performance indicator data may be calculated. In block 630, the quantitative results of the calculations may be stored. In block 635, a parameter may be changed, and the encoding, generating, and quantitatively assessing may be reiterated until an optimal number of dimensions of the latent space data is determined.

Although FIG. 6 illustrates an exemplary process 600 of the service, according to other embodiments, process 600 may include additional operations, fewer operations, and/or different operations than those illustrated in FIG. 6, and described herein. For example, according to other exemplary embodiments, the order of the computations may be different. Additionally, or alternatively, additional, different, and/or fewer quantitative statistical parameters may be calculated. For example, Bregman divergences (e.g., relative entropy, KL-divergence, etc.) may be used as the generalized distance measures. Similarly, metrics and methods based on non-Euclidean geometry and/or neural differential equations (e.g., a neural network may be represented as a differential equation) may be used.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation,""implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
receiving, by a device, network performance data pertaining to one or multiple network devices of a wireless network, wherein the network performance data includes performance indicator values that have n dimensions, network configuration data, and geographic information;
encoding, by the device, the network performance data to m dimensions, wherein m dimensions is fewer than the n dimensions;
generating, by the device based on the encoded network performance data, latent space data that is representative of the network performance data;
calculating, by the device, quantitative values, using the latent space data and decoded latent space data;
comparing, by the device, the quantitative values to threshold values;

selecting, by the device based on the comparing, one or multiple instances of the latent space data; and generating, by the device based on the selecting, first data that indicates network performance for a geographic area of a wireless service area.

2. The method of claim 1, wherein the geographic area includes at least one of one or multiple locations within which the one or multiple network devices reside or one or multiple locations that receive wireless service from the one or multiple network devices.

3. The method of claim 1, wherein the geographic area includes at least one of one or multiple locations within which one or multiple candidate network devices are to be deployed or one or multiple locations where prospective wireless service is to be provided.

4. The method of claim 1, wherein the quantitative values pertain to one or more quantitative criteria that include at least one of joint entropy, total correlation, divergence, or generalized Hausdorff distance.

5. The method of claim 1, further comprising:
determining, by the device subsequent to the calculating, that the encoding, the generating of latent space data, and the calculating are to be performed again; and
changing, by the device, one or more of a value of m, an optimizer type, an activation function, or hyperparameters of a generative model.

6. The method of claim 1, wherein the one or multiple network devices include one or multiple wireless stations, the wireless network includes a radio access network, and the geographic information includes terrain information pertaining to a service area of a wireless service.

7. The method of claim 1, wherein the performance indicator values include key performance indicator values, and wherein the generating of the latent space data further comprises:
generating, by the device, the latent space data based on a generative model that includes a generative adversarial network.

8. The method of claim 1, further comprising:
generating, by the device based on the selecting, second data that indicates a detected anomaly pertaining to at least one of the one or multiple network devices; and
using the second data to remedy the detected anomaly.

9. A device comprising:
a communication interface; and
a processor, wherein the processor is configured to:
receive, via the communication interface, network performance data pertaining to one or multiple network devices of a wireless network, wherein the network performance data includes performance indicator values that have n dimensions, network configuration data, and geographic information;
encode the network performance data to m dimensions, wherein m dimensions is fewer than the n dimensions;
generate, based on the encoded network performance data, latent space data that is representative of the network performance data;
calculate quantitative values using the latent space data and decoded latent space data;
compare the quantitative values to threshold values;
select, based on the comparison, one or multiple instances of the latent space data; and
generate, based on the selection, first data that indicates network performance for a geographic area of a wireless service area.

10. The device of claim 9, wherein the geographic area includes at least one of one or multiple locations within which the one or multiple network devices reside or one or multiple locations that receive wireless service from the one or multiple network devices.

11. The device of claim 9, wherein the geographic area includes at least one of one or multiple locations within which one or multiple candidate network devices are to be deployed or one or multiple locations where prospective wireless service is to be provided.

12. The device of claim 9, wherein the quantitative values pertain to one or more quantitative criteria that include at least one of joint entropy, total correlation, divergence, or generalized Hausdorff distance.

13. The device of claim 9, wherein the processor is further configured to:
determine subsequent to the calculating, that the encoding, the generating of latent space data, and the calculating are to be performed again; and
change one or more of a value of m, an optimizer type, an activation function, or hyperparameters of a generative model.

14. The device of claim 9, wherein the one or multiple network devices include one or multiple wireless stations, the wireless network includes a radio access network, and the geographic information includes terrain information pertaining to a service area of a wireless service.

15. The device of claim 9, wherein the performance indicator values include key performance indicator values, and wherein when generating the latent space data, the processor further executes the instructions to:
generate the latent space data based on a generative model that includes a generative adversarial network.

16. The device of claim 9, wherein the processor further executes the instructions to:
generate, based on the selection, second data that indicates a detected anomaly pertaining to at least one of the one or multiple network devices; and
using the second data to remedy the detected anomaly.

17. A non-transitory, computer-readable storage medium storing instructions executable by a processor of a device, which when executed cause the device to:
receive network performance data pertaining to one or multiple network devices of a wireless network, wherein the network performance data includes performance indicator values that have n dimensions, network configuration data, and geographic information;
encode the network performance data to m dimensions, wherein m dimensions is fewer than the n dimensions;
generate, based on the encoded network performance data, latent space data that is representative of the network performance data;
calculate quantitative values using the latent space data and decoded latent space data;
compare the quantitative values to threshold values;
select, based on the comparison, one or multiple instances of the latent space data; and
generate, based on the selection, first data that indicates network performance for a geographic area of a wireless service area.

18. The non-transitory, computer-readable medium of claim 17, wherein the geographic area includes at least one of one or multiple locations within which the one or multiple network devices reside or one or multiple locations that receive wireless service from the one or multiple network devices.

19. The non-transitory, computer-readable storage medium of claim 17, wherein the geographic area includes at least one of one or multiple locations within which one or multiple candidate network devices are to be deployed or one or multiple locations where prospective wireless service is to be provided.

20. The non-transitory, computer-readable storage medium of claim 17, wherein the one or multiple network devices include one or multiple wireless stations, the wireless network includes a radio access network, and the geographic information includes terrain information pertaining to a service area of a wireless service.

* * * * *